(12) United States Patent
Asami et al.

(10) Patent No.: US 6,562,901 B1
(45) Date of Patent: May 13, 2003

(54) RESIN COMPOSITION

(75) Inventors: Keiichi Asami, Chiba (JP); Taisaku Kano, Chiba (JP); Koichi Machida, Chiba (JP); Tsukasa Murakami, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/763,545

(22) PCT Filed: Jul. 4, 2000

(86) PCT No.: PCT/JP00/04428

§ 371 (c)(1),
(2), (4) Date: Feb. 23, 2001

(87) PCT Pub. No.: WO01/02451

PCT Pub. Date: Jan. 11, 2001

(30) Foreign Application Priority Data

Jul. 6, 1999 (JP) ............................................. 11-191574

(51) Int. Cl.⁷ ......................... C08L 51/00; C08L 63/91; C08F 265/02
(52) U.S. Cl. ......................... 525/64; 525/69; 525/301; 525/263
(58) Field of Search ........................... 525/64, 69, 301, 525/263

(56) References Cited

U.S. PATENT DOCUMENTS 4,721,757 A * 1/1988 Schindler .................... 525/245
5,747,596 A * 5/1998 Emert et al. ................. 525/301
6,313,224 B1 * 11/2001 Singer et al. ................. 525/208

FOREIGN PATENT DOCUMENTS

| EP | 947541 | 10/1999 |
| JP | 11-012329 | 1/1999 |
| JP | 11-124440 | 5/1999 |
| WO | WO99/20681 | 4/1999 |

* cited by examiner

Primary Examiner—James J. Seidleck
Assistant Examiner—Olga Asinovsky
(74) Attorney, Agent, or Firm—Burns, Doane, Swecker & Mathis, LLP

(57) ABSTRACT

Present invention is a resin composition obtained by reacting polyolefin (A) with a (co)polymer (B) prepared from a copolymerizable monomer mixture (C) comprising an $\alpha,\beta$-monoethylenically unsaturated monomer and other copolymerizable monomers in a weight ratio (A)/(B)=1/9–9/1 under radical generation in an organic solvent, or by polymerizing a copolymerizable monomer mixture (C) comprising an $\alpha,\beta$-monoethylenically unsaturated monomer and other copolymerizable monomers in the presence of polyolefin (A) in a weight ratio (A)/(C)=1/9–9/1 in an organic solvent and successively by reacting the obtained reaction mass under radical generation; and the resin composition has good solution stability, does not cause liquid phase separation or solid precipitation, can be used as intact, is excellent in sprayability at high concentration, and, specifically, has novel function and effect that adhesion to polyolefin molded articles is excellent; and the resin composition can be favorably used for coating and primer because a coated film obtained by using a curing agent capable of reacting with an active hydrogen atom and/or hydroxyl group of the resin composition has excellent weatherability.

27 Claims, No Drawings

RESIN COMPOSITION

TECHNICAL FIELD

The present invention relates to a polyolefin resin composition modified with a (co)polymer prepared from a copolymerizable monomer mixture comprising an α,β-monoethylenically unsaturated monomer and other copolymerizable monomer. More specifically, the invention relates to the resin composition used for a coating or primer of untreated polyolefin resin films, sheets and molded articles, or an adhesive.

BACKGROUND ART

Conventionally, polyolefin resins have good productivity, excellent moldability and many other advantages such as light weight, corrosion prevention and impact resistance, and are thus widely used for interiors and exteriors of automobiles and ships, home electrical appliances, furnitures, miscellaneous goods and building materials.

These polyolefin resin molded articles generally differ from polar synthetic resins represented by a polyurethane resin, polyamide resin, acrylic resin and polyester resin, and are nonpolar and crystalline. Consequently, general purpose coatings and adhesives are very difficult to coat or adhere these polyolefin resin molded articles.

As a result, in order to coat or adhere polyolefin resin molded articles, surface adhesion has been improved by primer treatment or activation of the surface. For example, automotive bumpers have enhanced surface adhesion to the coated film by etching treatment with a halogen based organic solvent such as trichloroethane, or desired coating or adhesion has been carried out after pretreatment such as corona discharge, plasma arc or ozone treatment.

However, these conventionally known coating and adhesion methods using a general purpose resin composition required high equipment cost and long application time, and additionally, lead to irregular finish and tend to cause local difference on the state of treated surface.

In order to solve the above problems, coating compositions have conventionally been proposed. For example, a composition obtained by introducing maleic acid into polyolefin has been disclosed in JP-B-62-21027/1987, and a composition having chlorinated polyolefin as a primary component has been disclosed in JP-B-50-10916/1975. However, these compositions are poor in weatherability, though excellent in adhesion properties to polyolefin molded articles. As a result, uses are usually limited to primer or to places where weatherability is not desired. When these compositions are used for coating places where weatherability is needed, a top coat is usually applied by using a two component system which requires complex operation.

Consequently, development of a coating has been carried out on a one component finishing system which can exhibit good adhesion properties to the material without any pretreatment and also has excellent weatherability. For example, a resin obtained by copolymerizing an acryl-based monomer with chlorinated polyolefin has been described in JP-A-58-71966/1983. A coating composition of a hydroxyacryl-chlorinated polyolefin copolymer and an isocyanate compound has been disclosed in JP-A-59-27968/1984.

Other proposals which have been made in the field are a process for introducing an unsaturated bond into polyolefin (JP-A-1-123812/1989 and 2-269109/1990), a process for introducing organic peroxide (JP-A-1-131220/1989) and a process for using bifunctional organic peroxide (JP-A-64-36614/1989). Any of these proposals are designs for improving reactivity of polyolefin with a radically polymerizable, unsaturated monomer.

However, in the above resin composition and the preparation process of the same, the reaction must be, in many cases, carried out in a dilute concentration particularly due to the problem of viscosity. As a result, graft polymerization efficiency to polyolefin is reduced and a homopolymer of the radically polymerizable, unsaturated monomer is liable to form. The resulting resin solution has a strong tendency to develop phase separation and usually has a disadvantage that the solution cannot be used as intact for coating.

The present invention provides a novel resin composition which can eliminate conventional problems mentioned above. That is, the resin composition of the invention can be applied to spray coating in a high concentration without developing a separation phenomenon of the resin solution, and can be used for coating, primer and adhesive. The film obtained by using the coating which comprises the resin composition of the invention and a curing agent capable of reacting with active hydrogen and/or a hydroxyl group can exhibit superior weatherability compared to a chlorinated polyolefin film and excellent adhesion properties compared to an untreated polyolefin resin film, sheet or molded article.

DISCLOSURE OF INVENTION

As a result of an intensive examination and investigation in order to achieve the above objects, the present inventors have found that the resin composition obtained by reacting a mixture of polyolefin and a specific (co)polymer, or a reaction mass resulting from polymerization of specific copolymerizable monomers in the presence of polyolefin under radical generation in the presence of in organic solvent, is very effective for achieving the above objects. Thus the invention has been completed.

That is, the present invention can be characterized by the following items (1) to (13).

(1) A resin composition characterized in being obtained by reacting polyolefin (A) with a (co)polymer (B) prepared from a copolymerizable monomer mixture (C) comprising an α,β-monoethylenically unsaturated monomer and other copolymerizable monomers, in a weight ratio (A)/(B) 1/9–9/1, under radical generation in an organic solvent.

(2) A resin composition characterized in being obtained by polymerizing a copolymerizable monomer mixture (C) comprising an α,β-monoethylenically unsaturated monomer and other copolymerizable monomers in the presence of polyolefin (A) in a weight ratio (A)/(C) 1/9–9/1 in an organic solvent, and successively by reacting the obtained reaction mass under radical generation.

(3) The resin composition according to item (1), wherein the (co)polymer (B) is modified to have a polymerizable unsaturated bond in the molecule.

(4) The resin composition according to item (3), wherein the modification is carried out by reacting a (co)polymer (B) having hydroxyl group in the molecule with a polymerizable unsaturated carboxylic anhydride.

(5) The resin composition according to anyone of items (1) to (4), wherein the resin composition comprises one or more third components selected from the group consisting of fats and fatty oils, derivatives of the same, epoxy resin and polyester resin.

(6) The resin composition according to item (5), wherein one or more third components have a polymerizable unsaturated bond in the molecule.

(7) The resin composition according to anyone of items (1) to (6), wherein the polymerization reaction under radical generation is carried out in the presence of organic peroxide.
(8) The resin composition according to item (7), wherein the organic peroxide has a tert-butyl and/or benzyl group.
(9) The resin composition characterized by removing the solvent from the resin composition in anyone of the items (1) to (8) and diluting the residue with an optional organic solvent.
(10) A coating characterized by comprising the resin composition according to anyone of items (1) to (9).
(11) A coated film characterized by applying the coating according to item (10).
(12) A coating characterized by consisting of a principal component comprising the resin composition having an active hydrogen atom and/or hydroxyl group according to anyone of items (1) to (9) and a curing agent capable of reacting with an active hydrogen atom and/or hydroxyl group.
(13) A coated film characterized by curing the coating according to item (12).

BEST MODE FOR CARRYING OUT THE INVENTION

One of the resin compositions in the invention can be obtained by reacting polyolefin (A) with the (co)polymer (B) prepared from the copolymerizable monomer mixture (C) comprising an α,β-monoethylenically unsaturated monomer and other copolymerizable monomers in the presence of the organic solvent under radical generation.

Polyolefin (A) which can be used in the invention includes, for example, a homopolymer or copolymer of ethylene, propylene, 1-butene, 1-heptene, 1-octene, 1-hexene, 1-decene and 4-methyl-1-pentene. These homopolymer and copolymer can comprise diene such as butadiene. Particularly, on preparing coating, primer and adhesive which are used for coating polypropylene materials, polyolefin (A) which can be preferable used is polypropylene or a copolymer having 50% by weight or more of propylene component.

The above polyolefin preferably has a weight average molecular weight (hereinafter referred to simply as Mw) in the rage of 5,000 to 200,000. When Mw is less than 5,000, the resin, composition obtained is liable to have poor adhesion properties to the material to be coated. On the other hand, Mw exceeding 200,000 gives high viscosity even in relatively low concentration on dissolving polyolefin into a solvent in the step of resin synthesis. Thus, preparation of the desired resin composition becomes difficult.

The (co)polymer (B) which can be used for the invention is prepared from an α,β-monoethylenically unsaturated monomer or a copolymerizable monomer mixture (C) comprising an α,β-monoethylenically unsaturated monomer and other copolymerizable monomers.

Representative α,β-monoethylenically unsaturated monomers which can be used for preparing the (co)polymer (B) in the invention include, for example, methyl (meth) acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, stearyl (meth) acrylate, tridecyl (meth)acrylate, lauryl (meth)acrylate, cyclohexyl (meth)acrylate, benzyl (meth)acrylate, phenyl (meth)acrylate, dimethylaminoethyl (meth)acrylate, diethylaminoethyl (meth)acrylate, and other (meth)acrylic acid esters; hydroxyethyl acrylate, 2-hydroxyethyl (meth) acrylate and other hydroxyvinyl compounds; acrylic acid, methacrylic acid, maleic acid, itaconic acid and other carboxyvinyl compounds and monoesters of the same; styrene, α-methylstyrene, vinyltoluene, tert-butylstyrene and other aromatic vinyl compounds; and other compounds such as acrylonitrile, methacrylonitrile, vinyl acetate, vinyl propionate, acrylamide, mathacrylamide, methylolacrylamide, methylolmethacrylamide, ethylene, propylene and $C_4$ to $C_{20}$ α-olefin.

Exemplary other copolymerizable monomers which constitute (co)polymer (B) in the invention include maleic anhydride, phthalic anhydride, succinic anhydride, and other carboxylic anhydrides which can copolymerize with α,β-monoethylenically unsaturated monomer.

The α,β-monoethylenically unsaturated monomer and other copolymerizable monomer which can be used in the invention exhibit radical polymerization property. The description methyl (meth)acrylate indicates methyl acrylate and methyl methacrylate.

The (co) polymer (B) in the invention can be prepared by using these monomers singly or as a mixture. For example, known acrylate resin can be used as a (co)polymer (B) of the invention.

The (co)polymer (B) prepared from these monomers can be modified to introduce a polymerizable unsaturated bond in the molecule. The modified (co)polymer (B) can also be used as a (co)polymer (B) of the invention. The (co)polymer prepared from hydroxymethyl acrylate, hydroxyethyl (meth) acrylate or other hydroxyvinyl compounds has a hydroxyl group in the structural units of the polymer molecule. The modified (co)polymer (B) can be prepared by addition of maleic anhydride, phthalic anhydride, succinic anhydride or other polymerizable unsaturated dicarboxylic anhydride to the hydroxyl group of the (co)polymer, by reacting the hydroxyl group with a remained isocyanate group resulting from reaction of a urethane resin having two isocyanate groups with a resin or monomer having a polymerizable unsaturated bond and hydroxyl group, or by other known processes.

The above hydroxyl group containing (co)polymer (B) has a hydroxyl value in the range of preferably 1 to 200 KOH mg/g, more preferably 5 to 150 KOH mg/g as solid.

The resin composition of the invention can be prepared by mixing the above polyolefin (A) and the (co)polymer (B) in an organic solvent in weight ratio (A)/(B)=1/9 to 9/1, preferably (A)/(B)=2/8 to 8/2, heating the mixture to 80 to 200° C., and reacting under radical generation. When the ratio (A)/(B) is less than 1/9, the adhesive or coating obtained from the resin composition has poor adhesion properties to the substrate. On the other hand, the ratio (A)/(B) exceeding 9/1 is also unfavorable because weatherability becomes poor and adhesion to the top coat falls down.

The solvent which can be used in the invention includes, for example, xylene, toluene, ethylbenzene and other aromatic hydrocarbon; hexane, heptane, octane, decane and other aliphatic hydrocarbon; cyclohexane, cyclohexene, methylcyclohexane and other alicyclic hydrocarbon; ethanol, isopropyl alcohol, and other aliphatic alcohol; and methyl ethyl ketone, methyl isobutyl ketone and other ketone solvents. A mixture of these solvents can also be used. In these solvents, aromatic hydrocarbon and aliphatic hydrocarbon can be preferably used. A particularly preferred solvent is aliphatic hydrocarbon having 6 to 20 carbon atoms. The organic solvent can be used in such an amount that the solution of polyolefin (A) in an organic solvent has an non-volatile content in the range of 2 to 70% by weight.

On carrying out a radical reaction, radical generation method which can be used is, for example, photo-irradiation in the presence of a photo-polymerization initiator, addition of organic peroxide, or other known methods.

Representative photo-polymerization initiators include, for example, benzoyl, benzoin methyl ether, benzoin isopropyl ether, benzyl, benzophenone, 2-hydroxy-2-methylpropiophenone, 2,2-diethoxyacetophenone, benzyl methylketal, anthraquinone, chloroanthraquinone, ethylanthraquinone, butylanthraquinone, diphenyl sulfide, dithiocarbamate, 2-chlorothioxanthon, α-chlromethylnaphthalenanthracene, 3,3',4,4'-tetrabenzophenone and 2,4,6-trimethylbenzoyldiphenylphosphine oxide. These initiators can be used singly or as a mixture. Michler's ketone, trimethyleneamine, alkylmorpholine, and other amine compounds can also be used in combination with these initiators.

The amount of the above photo-polymerization initiator is in the range of usually 0.01 to 10% by weight, preferably 0.1 to 5% by weight for the total weight of polyolefin (A) and (co)polymer (B). When the amount of photo-polymerization initiator is less than 0.01% by weight, the resulting resin solution is liable to develop a separation phenomenon. On the other hand, the amount exceeding 10% by weight tends to cause gelation.

Exemplarily organic peroxide includes compounds having a tert-butyl and/or benzyl group in the molecule, for example, di-tert-butyl peroxide, tert-butylperoxy-2-ethylhexanoate, benzoyl peroxide, dicumyl peroxide, tert-butylperoxybenzoate and cumene hydroperoxide. These peroxides can be used singly or as a mixture.

In the above organic peroxide compounds, di-tert-butyl peroxide and tert-butylperoxy-2-ethylhexanoate are more preferably used in the invention. That is, the organic peroxide having a tert-butyl and/or a benzyl groups in the molecule has a relatively high hydrogen drawing ability and is effective for improving grafting ratio to polyolefin. By using these peroxide compounds, the resin composition obtained becomes very difficult to develop separation phenomenon.

The amount of the above organic peroxide is in the range of usually 2 to 50% by weight, preferably 3 to 30% by weight for the total amount of polyolefin (A) and (co)polymer (B). When the amount of the organic peroxide is less than 3% by weight, the resulting resin solution is liable to exhibit separation phenomenon. Further, addition of the organic peroxide at one time is liable to cause gelation of the reaction mixture. Thus, addition is preferably carried out many times by small portions over a long time.

Another resin composition of the invention can be obtained by polymerizing a copolymerizable monomer mixture (C) comprising an α,β-monoethylenically unsaturated monomer and other copolymerizable monomers in the presence of polyolefin (A) in an organic solvent and successively reacting under radical generation in an organic solvent.

The α,β-monoethylenically unsaturated monomer and other copolymerizable monomers which are used for preparing the above-mentioned (copolymer (B) can also be used in the copolymerizable monomer mixture (C).

The organic solvent used for polymerizing the copolymerizable monomer mixture (C) in the presence of polyolefin (A) can be the same as the organic solvent used for the reaction of polyolefin (A) and the (co)polymer (B).

Polymerization initiators are used for starting polymerization of the copolymerizable monomer mixture (C) in the presence of polyolefin (A). Representative polymerization initiators include, for example, di-tert-butyl peroxide, tert-butylperoxy-2-ethylhexanoate, benzoyl peroxide, dicumyl peroxide, lauroyl peroxide, tert-butylperoxybenzoate, cumene hydroperoxide and other organic peroxide compounds; azobisisobutyronitrile, 4,4'-azobis(4-cyanopentanoic acid), 2,2'-azobis[2-methyl-N-(2-hydroxyethyl)propionamide] and other azo compounds. These initiators can be used singly or as a mixture.

In one of the preparation process of the resin composition in the invention, the above organic solvent solution of polyolefin (A), the copolymerizable monomer mixture (C) and the above polymerization initiator are simultaneously fed to the reaction zone and polymerization of the monomer mixture (C) is carried out under a constant weight ratio; polyolefin (A)/copolymerizable monomer (C) which is in the range of 1/9 to 9/1, more preferably 2/8 to 8/2.

When the ratio (A)/(C) is less than 1/9, the resultant coating or adhesive has poor adhesion to substrate. On the other hand, the ratio exceeding 9/1 is also unfavorable because weatherability becomes poor and adhesion properties to the topcoat are impaired.

The resin composition of the invention can be prepared by reacting thus obtained resin mixture under radical generation in an organic solvent similarly to the above reaction of polyolefin (A) and copolymer (B). The resin composition obtained by such process has much improved stability and low viscosity as compared with the resin composition obtained by reaction of (co)polymer (B) and polyolefin (A). Consequently, coating operation can be carried out in a high concentration.

One or more materials selected from the group consisting of oils and fats, derivatives of the same, epoxy resin and polyester resin can be added as a third component in the stage of polymerizing the copolymerizable monomer mixture (C) in the presence of polyolefin (A) and/or the stage of reaction under radical generation.

Representative oils and fats which can be used as the third component include, for example, linseed oil, soybean oil and castor oil and purified products of these oils.

Exemplarily derivatives of oils and fats which can be used for the third component include short-, medium- and long-oil alkyd resins which have a skeleton consisting of polybasic acid such as phthalic acid and polyhydric alcohol such as ethylene glycol, glycerol and pentaerythritol and are modified with fatty acid in oils and fats; further modified alkyd resins obtained by further modifying these modified alkyd resins with natural resin, synthetic resin or polymerizable monomer, for example, rosin-, phenol-, epoxy-, acryl- and urethane-modified alkyd resins.

When adding carboxylic anhydride having polymerizable unsaturated bond in the molecule to oils and fats having hydroxyl groups, the resulting oils and fats having polymerizable unsaturated bond can also be used for the invention. The above oils and fats and derivatives of the same, can be used singly or as a mixture.

Representative epoxy resins which can be used for the third component include epoxy resins obtained by reacting bisphenol A, bisphenol F or novolak with glycidyl ether, or obtained by adding propylene oxide or ethylene oxide to bisphenol A and successively reacting with glycidyl ether. Other epoxy resins which can be used include amine modified epoxy resin obtained by addition of polyfunctional amine to an epoxy group, aliphatic epoxy resin, alicyclic epoxy resin and polyether-based epoxy resin.

Still another epoxy resin which is obtained by addition of polymerizable unsaturated carboxylic anhydride to the above hydroxylated epoxy resin and has polymerizable unsaturation in the molecule can also be used in the invention. The above epoxy resins can be used singly or as a mixture.

The polyester resin which can be used for the third component can be obtained by polycondensation of a carboxylic acid ingredient and alcoholic ingredient. The carboxylic ingredient includes, for example, terephthalic acid, isophthalic acid, phthalic anhydride, naphthalenedicarboxylic acid, succinic acid, glutaric acid, adipic acid, azelaic acid, 1,10-decanedicarboxylic acid, cyclohexanedicarboxylic acid, trimellitic acid, maleic acid, fumaric acid and other polycarboxylic acids and lower alcohol ester of the same; p-oxybenzoic acid and other hydroxycarboxylic acids; and benzoic acid and other monocarboxylic acids. These acids can be used singly or as a mixture.

The alcohol ingredient includes, for example, ethylene glycol, diethylene glycol, 1,3-propanediol, 1,3-butanediol, 1,4-butanediol, 1,5-pentanediol, 1,6-hexanediol, 1,10-decanediol, 3-methylpentanediol, 2,2'-diethyl-1,3-propanediol, 2-ethyl-1,3-hexanediol, neopentylglycol, trimethylolethane, trimethylolpropane, glycerol, pentaerythritol, ethylene oxide adduct of bisphenol A, propylene oxide adduct of bisphenol A, propylene oxide adduct of hydrogenated bisphenol A and ethylene oxide adduct of hydrogenated bisphenol A. These alcoholic ingredients can be used singly or as a mixture.

The invention can also use a polyester resin which is obtained by addition of carboxylic anhydride having polymerizable unsaturated bond in the molecule to the above hydroxyl group containing polyester resin and has a polymerizable unsaturated bond in the molecule.

The above polyester resin can be used singly or as a mixture.

The third component above can be added by feeding to a reactor or can be previously charged to the reactor. The amount of the third component is usually 0.5 to 60% by weight, preferably 5 to 40% by weight for the resin component.

The third component can also be added after radical generation step.

When oils and fats or derivatives of the same are used for the third component, the resulting resin composition has particularly excellent stability, good compatibility with other resins, and extremely enhanced peel strength. Specifically, castor oil containing resin composition is very excellent.

The resin composition of the invention can be used as intact for coating, primer or adhesive. The resin composition prepared from hydroxyethyl acrylate, 2-hydroxyethyl methacrylate, acrylic acid or methacrylic acid and having an active hydrogen atom and/or a hydroxyl group in the resin can be used for coating in combination with a curing agent capable of reacting with an active hydrogen atom and/or a hydroxyl group. For example, polyurethane-based coating, primer or adhesive can be used by mixing the resin composition with a polyisocyanate-based curing agent capable of reacting with an active hydrogen atom and/or a hydroxyl group.

Representative polyisocyanate-based curing agents which can be used include, for example, phenylene diisocyanate, tolylene diisocyanate, xylylene diisocyanate, diphenylmethane diisocyanate and other aromatic diisocyanates; hexamethylene diisocyanate, trimethylhexamethylene diisocyanate, lysine diisocyanate and other aliphatic diisocyanates; and isophorone diisocyanate, dicyclohexylmethane diisocyanate and other alicyclic diisocyanates. Isocyanate terminated prepolymer obtained by reacting the above diisocyanate compounds with polyhydric alcohol, polyetherpolyol or polyesterpolyol can also be used.

Amino resin prepared from melamine or urea can also be used as a curing agent.

The resin composition of the invention and the curing agent capable of reacting with an active hydrogen atom and/or a hydroxyl group can be used in an arbitrary ratio.

When the curing agent capable of reacting with an active hydrogen atom and/or a hydroxyl group has an isocyanate group, the equivalent ratio of an active hydrogen atom to an isocyanate group is preferably in the range of 0.5:1.0 to 1.0:0.5, more preferably 0.8:1.0 to 1.0:0.8.

When the curing agent capable of reacting with active hydrogen atom and/or a hydroxyl group is an amino resin, the weight ratio of resin composition of the invention/amino resin as solid is preferably in the range of 95/5 to 20/80, more preferably 90/10 to 60/40.

The above obtained resin composition of the invention can be used as intact for coating, primer and adhesive. However, the resin composition can be incorporated, when needed, with additives such as an antioxidant, weatherability improver, heat stabilizer and other various species of stabilizers; inorganic pigment, organic pigment and other colorants; and carbon black, ferrite and other electrically conductive fillers.

No particular restriction is imposed upon the method for coating the surface of molded articles with the resin composition of the invention or with a mixture of the resin composition of the invention and the curing agent capable of reacting with an active hydrogen atom and/or a hydroxyl group. Spraying method is favorable. For example, coating can be carried out by spraying with a spray gun on the surface of molded articles. Application can be usually carried out with ease at room temperature. No particular limitation is put upon the drying method after application. Natural drying, forced drying by heating and other suitable methods can be used.

The resin composition of the invention and the mixture of the resin composition and the curing agent capable of reacting with an active hydrogen atom and/or a hydroxyl group can be used due to the characteristics thereof for a broad field of primer in addition to the above uses for coating. For example, the dried surface obtained above can be further painted with other coatings by electrostatic deposition, spraying or brushing. Other coatings which can be used are not restricted in particular and include, for example, solvent type thermoplastic acrylate resin coating, solvent type thermosetting acrylate resin coating, acryl-modified alkyd resin coating, epoxy resin coating, polyurethane resin coating and melamine resin coating.

Further, the resin composition of the invention or the mixture thereof and curing agent capable of reacting with an active hydrogen atom and/or a hydroxyl group can be favorably used for a topcoat of molded articles prepared by using, for example, polyethylene, polypropylene, polystyrene and other polyolefins; ethylene-propylene copolymer, ethylene-butene copolymer, propylene-butene copolymer, ethylene-propylene-butene copolymer and other olefin copolymers; and mixture of polypropylene and synthetic rubber, and can also be used for surface treatment of polyamide resin, unsaturated polyester resin, polycarbonate resin and a steel plate or a steel plate treated by electrodeposition.

Further more, the resin composition of the invention or the mixture thereof and curing agent capable of reacting with active hydrogen atom and/or a hydroxyl group can be used for a primer of coating and adhesive which consist primarily of polyurethane resin, polyester resin, melamine resin or epoxy resin. Such primer can improve adhesion properties of coating to various species of coated surface of articles and at the same time can form a coated film having excellent brilliancy.

The resin composition of the invention or the mixture thereof and curing agent capable of reacting with active hydrogen atom and/or a hydroxyl group can be favorably used in particular for a topcoat of molded articles prepared by using polypropylene and other polyolefin, a mixture of polypropylene and synthetic rubber, unsaturated polyester, epoxy resin and polyurethane resin, and also for a primer for improving adhesion properties of the topcoat to the surface of these molded articles.

EXAMPLE

The invention will hereinafter be illustrated further in detail by preparation processes of the resin composition and test example. Part and % are a weight basis unless otherwise noted.

Preparation Examples 1–27

Preparation of (co)Polymer (B)

To a four necked flask equipped with a stirrer, thermometer, reflux condenser and nitrogen inlet tube, the solvent shown on the column of Preparation of (co)polymer (B) in Table 1-1 and 1-2 was charged and heated to 100° C. in a nitrogen atmosphere. Successively, a mixture of the monomer and polymerization initiator shown on the column of Preparation of (co)polymer (B) in Table 1-1 and 1-2 was fed to the solvent over 4 hours. After 1 hour from the end of feeding, 0.4 part of t-butylperoxy-2-ethylhexanoate (hereinafter referred to simply as PBO) was added and further reacted for 2 hours. Thereafter, the reaction mixture was diluted to a nonvolatile content of 50% by addition of the same solvent as used in the above reaction and thus the (co)polymer (B) was obtained as a mass having an nonvolatile content of 50%.

Preparation Examples 28–54

Preparation of Carboxylic Anhydride Added (co)Polymer (B)

To a four necked flask equipped with a stirrer, thermometer, reflux condenser and nitrogen inlet tube, the solvent shown on the column of Preparation of (co)polymer (B) in Table 1-3 and 1-4 was charged and heated to 100° C. in a nitrogen atmosphere. Successively, a mixture of the monomer and polymerization initiator shown on the column of Preparation of (co)polymer (B) in Table 1-3 and 1-4 was fed to the solvent over 4 hours. After 1 hour from the end of feeding, 0.4 part of PBO was added and further reacted for 2 hours. Thereafter, the reaction mixture was diluted to a nonvolatile content of 50% by addition of the same solvent as used in the above reaction. Thereafter, the reaction mixture was heated to 100° C. and carboxylic anhydride shown on the column of Addition of carboxylic anhydride in Table 1-3 and 1-4 was added and reacted for 1 hour. Carboxylic anhydride added (co)polymer (B) was obtained.

Examples 1–54

Preparation of Resin Composition

To the solution of (co)polymer (B) or carboxylic anhydride added (co)polymer (B) which was obtained in the above preparation examples, polyolefin(A) and solvent shown on the column of Reaction in Table 1-1 to 1-4 were added. In Examples 14–27 and 41–54, the third component shown in Table 1-4 was further added. The resulting mixture was heated to 135° C. in a nitrogen atmosphere. When the solvent was toluene, the resulting mixture was heated to 105° C. Successively, di-tert-butyl peroxide (hereinafter referred to simply as PBD) was added in an amount shown on the column of Reaction in Table 1-1 to 1-4. PBD was added by three portions, that is, a 3/7 portion at the first addition, 2/7 portion after 1 hour, and 2/7 portion after 2 hours. After finishing PBD addition, the reaction was carried out for 2 hours. Successively, the same solvent as used in the above reaction was added to make an nonvolatile content 30%. The resin composition of the invention was thus obtained.

Examples 55–81

To a four necked flask equipped with a stirrer, thermometer, reflux condenser and nitrogen inlet tube, polyolefin (A) and the solvent shown in Table 1-5 and 1-6 were charged and heated to 130° C. in a nitrogen atmosphere. Successively, a mixture of monomer (C) and polymerization initiator which are shown in Table 1-5 and 1-6 were fed over 4 hours. In Examples 68–81, a mixture of copolymerizable monomer (C), polymerization initiator and the third component which are shown in Table 1-5 and 1-6 were fed over 4 hours. After 30 minutes from the end of feeding, the reaction temperature was raised to 135° C. and the reaction was further continued for 30 minutes. Thereafter, the dilution solvent 1 shown in Table 1-5 and 1-6 was added in an amount shown in the Table and at the same time, 1 part of polymerization initiator PBD was added. After 30 minutes, the reaction mixture was heated to 160° C. Organic peroxide PBD shown in Table 1-5 and 1-6 was divided into three portions and added the first 3/7 portion after 30 minutes from temperature rise, second 2/7 portion after 1.5 hours and the third 2/7 portion after 2.5 hours. After finishing PBD addition, the reaction mixture was allowed to stand for 2 hours to progress the reaction. The dilution solvent 2 shown in Table 1-5 and 1-6 was added to make nonvolatile content 40%. The resin composition of the invention was obtained.

In Example 64, polyolefin (A) and the solvent shown in Table 1-5 were charged to a four necked flask equipped with a stirrer, thermometer, reflux condenser and nitrogen inlet tube and heated to 100° C., a mixture of copolymerizable monomer mixture (C) in Table 1-5 and polymerization initiator, azobisisobutyronitrile (hereinafter referred to simply as AIBN) was fed to the reaction mixture over 4 hours. After 90 minutes, the dilution solvent 1 shown in Table 1-5 was added and at the same time 0.75 part of AIBN was added. After 30 minutes from addition of AIBN, the reaction mixture was heated to 160° C. The organic peroxide PBD shown in Table 1-5 was divided into three portions and added the first 3/7 portion after 30 minutes from temperature rise, the second 2/7 portion after 1.5 hours and third 2/7 portion after 2.5 hours. After finishing PBD addition, the reaction mixture was allowed to stand for 2 hours to progress the reaction. The dilution solvent 2 shown in Table 1-5 was added to make a nonvolatile content 40%. The resin composition of the invention was obtained.

TABLE 1-1

| | | (parts by weight) Example | | | | | | | | | | |
|---|---|---|---|---|---|---|---|---|---|---|---|---|
| | | 1~4 | 5 | 6 | 7 | 8 | 9 | 10 | 11 | 12 | 13 | 14 | 15 |
| Preparation of copolymer (B) | | | | | | | | | | | | | |
| Solvent | xylene | 72 | 72 | 72 | 72 | | 72 | 72 | 72 | 72 | 72 | 72 | 72 |
| | toluene | | | | | 72 | | | | | | | |
| Copolymerizable monomer mixture (C) | styrene | 10 | 10 | 10 | 10 | 10 | 10 | 10 | 66.6 | | | 15 | 15 |
| | methyl methacrylate | 66.6 | 66.6 | 66.6 | 66.6 | 66.6 | 66.6 | 59.6 | 10 | 55.6 | 55.6 | | |
| | ethyl acrylate | 16 | 16 | 16 | 16 | 16 | 16 | 16 | 16 | | | | |
| | butyl acrylate | | | | | | | | | | | 20 | 20 |
| | butyl methacrylate | | | | | | | | | | | 59 | 59 |
| | isobutyl methacrylate | | | | | | | | | 30 | 30 | 30 | |
| | hydroxyethel methacrylate | 7 | 7 | 7 | 7 | 7 | 14 | 7 | 14 | 14 | 14 | 5 | 5 |
| | acrylic acid | | | | | | 0.4 | | | | | | |
| | methacrylic acid | 0.4 | 0.4 | 0.4 | 0.4 | 0.4 | | 0.4 | 0.4 | 0.4 | 0.4 | 1 | 1 |
| Polymerization initiator | PBO | 1.5 | 1.5 | 1.5 | 1.5 | 1.5 | 1.5 | 1.5 | 1.5 | 1.5 | 1.5 | 1.5 | 1.5 |
| Dilution solvent | xylene | 28 | 28 | 28 | 28 | | 28 | 28 | 28 | 28 | 28 | 28 | 28 |
| | toluene | | | | | 28 | | | | | | | |
| Reaction | | | | | | | | | | | | | |
| Polyolefin (A) | | 100 | 43 | 233 | 100 | 100 | 100 | 100 | 100 | 43 | 233 | 100 | 100 |
| Oils and fats | OLESTER C-1000 | | | | | | | | | | | 20 | |
| | OLESTER F77-60MS | | | | | | | | | | | | 33.3 |
| | Modified OLESTER C-1000 | | | | | | | | | | | | |
| Epoxy resin | EPOMIK R-140 | | | | | | | | | | | | |
| | DENACOL EX-941 | | | | | | | | | | | | |
| | Modified EPOMIK R-140 | | | | | | | | | | | | |
| Polyester resin | ALMATEX P-646 | | | | | | | | | | | | |
| | OLESTER Q-173 | | | | | | | | | | | | |
| | Modified ALMATEX P-646 | | | | | | | | | | | | |
| Solvent | xylene | 100 | 43 | 233 | 100 | | 100 | 100 | 100 | 43 | 233 | 100 | 86.7 |
| | toluene | | | | | 100 | | | | | | | |
| Organic peroxide | PBD | 14 | 10 | 23.3 | 23.3 | 14 | 23.3 | 14 | 14 | 10 | 23.3 | 14 | 14 |
| Dilution solvent | xylene | 267 | 191 | 444 | 267 | | 267 | 267 | 267 | 191 | 444 | 313 | 313 |
| | toluene | | | | | 267 | | | | | | | |

TABLE 1-2

| | | (parts by weight) Example | | | | | | | | | | | |
|---|---|---|---|---|---|---|---|---|---|---|---|---|
| | | 16 | 17 | 18 | 19 | 20 | 21 | 22 | 23 | 24 | 25 | 26 | 27 |
| Preparation of copolymer (B) | | | | | | | | | | | | | |
| Solvent | xylene | 72 | 72 | 72 | 72 | 72 | 72 | 72 | 72 | 72 | 72 | 72 | 72 |
| | toluene | | | | | | | | | | | | |
| Copolymerizable monomer mixture (C) | styrene | 15 | 15 | 15 | 15 | 15 | 15 | 15 | 15 | 15 | 15 | 15 | 15 |
| | methyl methacrylate | | | | | | | | | | | | |
| | ethyl acrylate | | | | | | | | | | | | |
| | butyl acrylate | 20 | 20 | 20 | 20 | 20 | 20 | 20 | 20 | 20 | 20 | 20 | 20 |
| | butyl methacrylate | 59 | 59 | 59 | 59 | 59 | 59 | 59 | 59 | 59 | 59 | 59 | 59 |
| | isobutyl methacrylate | | | | | | | | | | | | |
| | hydroxyethel methacrylate | 5 | 5 | 5 | 5 | 5 | 5 | 5 | 5 | 5 | 5 | 5 | 5 |
| | acrylic acid | | | | | | | | | | | | |
| | methacrylic acid | 1 | 1 | 1 | 1 | 1 | 1 | 1 | 1 | 1 | 1 | 1 | 1 |
| Polymerization initiator | PBO | 1.5 | 1.5 | 1.5 | 1.5 | 1.5 | 1.5 | 1.5 | 1.5 | 1.5 | 1.5 | 1.5 | 1.5 |
| Dilution solvent | xylene | 28 | 28 | 28 | 28 | 28 | 28 | 28 | 28 | 28 | 28 | 28 | 28 |
| | toluene | | | | | | | | | | | | |
| Reaction | | | | | | | | | | | | | |
| Polyolefin (A) | | 100 | 100 | 100 | 100 | 100 | 100 | 100 | 100 | 100 | 100 | 100 | 100 |
| Oils and fats | OLESTER C-1000 | | | | | 20 | 20 | | | | | 15 | 15 | 15 |
| | OLESTER F77-60MS | | | | | | | | | | | | | |
| | Modified OLESTER C-1000 | | | | | | | | | 20 | | 5 | | |
| Epoxy resin | EPOMIK R-140 | 20 | | | | 10 | | | | | | | | |
| | DENACOL EX-941 | | 20 | | | | | | | | | | | |
| | Modified EPOMIK R-140 | | | | | | | | | | 20 | | 5 | |

TABLE 1-2-continued

| | | (parts by weight) Example | | | | | | | | | | | |
|---|---|---|---|---|---|---|---|---|---|---|---|---|
| | | 16 | 17 | 18 | 19 | 20 | 21 | 22 | 23 | 24 | 25 | 26 | 27 |
| Polyester resin | ALMATEX P-646 | | | 33.3 | | | | | | | | | |
| | OLESTER Q-173 | | | | 20 | | 10 | | | | | | |
| | Modified ALMATEX P-646 | | | | | | | | | 33.3 | | | 8.3 |
| Solvent | xylene | 100 | 100 | 86.7 | 100 | 100 | 100 | 100 | 100 | 86.7 | 100 | 100 | 96.7 |
| | toluene | | | | | | | | | | | | |
| Organic peroxide | PBD | 14 | 14 | 14 | 14 | 14 | 14 | 14 | 14 | 14 | 14 | 14 | 14 |
| Dilution solvent | xylene | 313 | 313 | 313 | 313 | 313 | 313 | 313 | 313 | 313 | 313 | 313 | 313 |
| | toluene | | | | | | | | | | | | |

TABLE 1-3

| | | (parts by weight) Example | | | | | | | | | | | |
|---|---|---|---|---|---|---|---|---|---|---|---|---|
| | | 28–31 | 32 | 33 | 34 | 35 | 36 | 37 | 38 | 39 | 40 | 41 | 42 |
| Preparation of copolymer (B) | | | | | | | | | | | | | |
| Solvent | xylene | 72 | 72 | 72 | 72 | 72 | | 72 | 72 | 72 | 72 | 72 | 72 |
| | toluene | | | | | | 72 | | | | | | |
| Copolymerizable monomer mixture (C) | styrene | 10 | 10 | 10 | 10 | | 10 | 66.6 | 10 | 10 | 10 | 15 | 15 |
| | methyl methacrylate | 66.6 | 66.6 | 66.6 | 59.6 | 45.6 | 66.6 | 10 | 66.6 | 59.6 | 59.6 | | |
| | ethyl acrylate | 16 | 16 | 16 | 16 | | 16 | 16 | 16 | 16 | 16 | | |
| | butyl acrylate | | | | | | | | | | | 20 | 20 |
| | butyl methacrylate | | | | | | | | | | | 59 | 59 |
| | isobutyl methacrylate | | | | | 40 | | | | | | | |
| | hydroxyethel methacrylate | 7 | 7 | 7 | 14 | 14 | 7 | 7 | 7 | 14 | 14 | 5 | 5 |
| | acrylic acid | | | | 0.4 | | | | | | | | |
| | methacrylic acid | 0.4 | 0.4 | 0.4 | | 0.4 | 0.4 | 0.4 | 0.4 | 0.4 | 0.4 | 1 | 1 |
| Polymerization initiator | PBO | 1.5 | 1.5 | 1.5 | 1.5 | 1.5 | 1.5 | 1.5 | 1.5 | 1.5 | 1.5 | 1.5 | 1.5 |
| | 28 | 28 | 28 | 28 | 28 | | 28 | 28 | 28 | 28 | 28 | 28 | |
| Dilution solvent | xylene | | | | | | 28 | | | | | | |
| | toluene | 2 | 2 | 2 | 2 | 2 | 2 | 2 | | 6 | | 2 | 2 |
| Addition of carboxylic anhydride Reaction | maleic anhydride | | | | | | | | 6 | | 15 | | |
| | dodecenyl succinic anhydride | | | | | | | | | | | | |
| Polyolefin (A) | | 100 | 43 | 233 | 100 | 100 | 100 | 100 | 100 | 100 | 100 | 100 | 100 |
| Oils and fats | OLESTER C-1000 | | | | | | | | | | | 20 | |
| | OLESTER F77-60MS | | | | | | | | | | | | 33.3 |
| | Modified OLESTER C-1000 | | | | | | | | | | | | |
| Epoxy resin | EPOMIK R-140 | | | | | | | | | | | | |
| | DENACOL EX-941 | | | | | | | | | | | | |
| | Modified EPOMIK R-140 | | | | | | | | | | | | |
| Polyester resin | ALMATEX P-646 | | | | | | | | | | | | |
| | OLESTER Q-173 | | | | | | | | | | | | |
| | Modified ALMATEX P-646 | | | | | | | | | | | | |
| Solvent | xylene | 100 | 43 | 233 | 100 | 100 | | 100 | 100 | 100 | 100 | 100 | 86.7 |
| | toluene | | | | | | 100 | | | | | | |
| Organic peroxide | PBD | 14 | 10 | 23.3 | 14 | 14 | 14 | 14 | 14 | 14 | 14 | 14 | 14 |
| Dilution solvent | xylene | 271 | 195 | 449 | 271 | 271 | | 271 | 281 | 281 | 302 | 318 | 318 |
| | toluene | | | | | | 271 | | | | | | |

TABLE 1-4

| | | (parts by weight) Example | | | | | | | | | | | |
|---|---|---|---|---|---|---|---|---|---|---|---|---|
| | | 43 | 44 | 45 | 46 | 47 | 48 | 49 | 50 | 51 | 52 | 53 | 54 |
| Preparation of copolymer (B) | | | | | | | | | | | | | |
| Solvent | xylene | 72 | 72 | 72 | 72 | 72 | 72 | 72 | 72 | 72 | 72 | 72 | 72 |
| | toluene | | | | | | | | | | | | |

TABLE 1-4-continued

| | | (parts by weight) Example | | | | | | | | | | | |
|---|---|---|---|---|---|---|---|---|---|---|---|---|
| | | 43 | 44 | 45 | 46 | 47 | 48 | 49 | 50 | 51 | 52 | 53 | 54 |
| Copolymerizable monomer mixture (C) | styrene | 15 | 15 | 15 | 15 | 15 | 15 | 15 | 15 | 15 | 15 | 15 | 15 |
| | methyl methacrylate | | | | | | | | | | | | |
| | ethyl acrylate | | | | | | | | | | | | |
| | butyl acrylate | 20 | 20 | 20 | 20 | 20 | 20 | 20 | 20 | 20 | 20 | 20 | 20 |
| | butyl methacrylate | 59 | 59 | 59 | 59 | 59 | 59 | 59 | 59 | 59 | 59 | 59 | 59 |
| | isobutyl methacrylate | | | | | | | | | | | | |
| | hydroxyethel methacrylate | 5 | 5 | 5 | 5 | 5 | 5 | 5 | 5 | 5 | 5 | 5 | 5 |
| | acrylic acid | | | | | | | | | | | | |
| | methacrylic acid | 1 | 1 | 1 | 1 | 1 | 1 | 1 | 1 | 1 | 1 | 1 | 1 |
| Polymerization initiator | PBO | 1.5 | 1.5 | 1.5 | 1.5 | 1.5 | 1.5 | 1.5 | 1.5 | 1.5 | 1.5 | 1.5 | 1.5 |
| Dilution solvent | xylene | 28 | 28 | 28 | 28 | 28 | 28 | 28 | 28 | 28 | 28 | 28 | 28 |
| | toluene | | | | | | | | | | | | |
| Addition of carboxylic anhydride Reaction | maleic anhydride | 2 | 2 | 2 | 2 | 2 | 2 | 2 | 2 | 2 | 2 | 2 | 2 |
| | dodecenyl succinic anhydride | | | | | | | | | | | | |
| Polyolefin (A) | | 100 | 100 | 100 | 100 | 100 | 100 | 100 | 100 | 100 | 100 | 100 | 100 |
| Oils and fats | OLESTER C-1000 | | | | | 20 | 20 | | | | 15 | 15 | 15 |
| | OLESTER F77-60MS | | | | | | | | | | | | |
| | Modified OLESTER C-1000 | | | | | | | 20 | | | 5 | | |
| Epoxy resin | EPOMIK R-140 | 20 | | | 10 | | | | | | | | |
| | DENACOL EX-941 | | 20 | | | | | | | | | | |
| | Modified EPOMIK R-140 | | | | | | | | | 20 | | 5 | |
| Polyester resin | ALMATEX P-646 | | | 33.3 | | | | | | | | | |
| | OLESTER Q-173 | | | | 20 | | 10 | | | | | | |
| | Modified ALMATEX P-646 | | | | | | | | | | 33.3 | | 8.3 |
| Solvent | xylene | 100 | 100 | 86.7 | 100 | 100 | 100 | 100 | 100 | 100 | 86.7 | 100 | 96.7 |
| | toluene | | | | | | | | | | | | |
| Organic peroxide | PBD | 14 | 14 | 14 | 14 | 14 | 14 | 14 | 14 | 14 | 14 | 14 | 14 |
| Dilution solvent | xylene | 318 | 318 | 318 | 318 | 341 | 341 | 318 | 318 | 318 | 318 | 318 | 318 |
| | toluene | | | | | | | | | | | | |

TABLE 1-5

| | | (parts by weight) Example | | | | | | | | | | | |
|---|---|---|---|---|---|---|---|---|---|---|---|---|
| | | 55–57 | 58–60 | 61 | 62 | 63 | 64 | 65 | 66 | 67 | 68 | 69 | 70 |
| Solvent | SHELLSOL 70 | 72 | | 72 | 72 | 72 | 72 | 72 | 72 | 72 | 72 | 72 | 72 |
| | xylene | | 72 | | | | | | | | | | |
| Polyolefin A | | 30 | 30 | 50 | 70 | 30 | 30 | 30 | 30 | 30 | 50 | 50 | 50 |
| Copolymerizable monomer mixer (C) | styrene | 7 | 7 | 5 | 3 | 7 | 7 | 40 | | 14 | 8 | 8 | 8 |
| | methyl methacrylate | 46.6 | 46.6 | 33.3 | 20 | 46.6 | 46.6 | 13.6 | 7 | | | | |
| | ethyl acrylate | 11.2 | 11.2 | 8 | 4.8 | 11.2 | 11.2 | 11.2 | | | | | |
| | butyl acrylate | | | | | | | | 21 | | 10 | 10 | 10 |
| | butyl methacrylate | | | | | | | | 31.2 | | 29 | 29 | 29 |
| | isobutyl methacrylate | | | | | | | | | 41 | | | |
| | 2-ethylhexyl acrylate | | | | | | | | | 11.2 | | | |
| | hydroxyethel acrylate | | | | | | | | 10.5 | | | | |
| | hydroxyethel methacrylate | 4.9 | 4.9 | 3.5 | 2.1 | 4.9 | 4.9 | 4.9 | | 3.5 | 2.5 | 2.5 | 2.5 |
| | methacrylic acid | 0.28 | 0.28 | 0.2 | 0.12 | 0.28 | 0.28 | 0.28 | 0.28 | 0.28 | 0.5 | 0.5 | 0.5 |
| Oils and fats | OLESTER C-1000 | | | | | | | | | | 10 | | |
| | OLESTER F77-60MS | | | | | | | | | | 16.7 | | |
| | Modified OLESTER C-1000 | | | | | | | | | | | | |
| Epoxy resin | EPOMIK R-140 | | | | | | | | | | | | 10 |
| | DENACOL EX-941 | | | | | | | | | | | | |
| | Modified EPOMIK R-140 | | | | | | | | | | | | |
| Polyester resin | ALMATEX P-646 | | | | | | | | | | | | |
| | OLESTER Q-173 | | | | | | | | | | | | |
| | Modified ALMATEX P-646 | | | | | | | | | | | | |
| Polymerization initiator | PBD | 1.0 | 1.0 | 1.0 | 1.0 | 1.0 | | 1.0 | 1.0 | 1.0 | 1.0 | 1.0 | 1.0 |
| | AIBN | | | | | | 1.0 | | | | | | |
| Dilution solvent 1 | SHELLSOL 70 | 28 | | 28 | 28 | 28 | 28 | 28 | 28 | 28 | 28 | 21.3 | 28 |
| | xylene | | 28 | | | | | | | | | | |
| Organic peroxide | PBD | 7 | 7 | 7 | 7 | 30 | 7 | 7 | 7 | 7 | 7 | 7 | 7 |
| Dilution solvent 2 | xylene | 50 | 50 | 50 | 50 | 50 | 50 | 50 | 50 | 50 | 65 | 65 | 65 |

SHELLSOL 70 isoparaffin based organic solvent (manufactured by Shell Japan)

TABLE 1-6

| | | (parts by weight) Example | | | | | | | | | | |
|---|---|---|---|---|---|---|---|---|---|---|---|---|
| | | 71 | 72 | 73 | 74 | 75 | 76 | 77 | 78 | 79 | 80 | 81 |
| Solvent | SHELLSOL 70 | 72 | 72 | 72 | 72 | 72 | 72 | 72 | 72 | 72 | 72 | 72 |
| | xylene | | | | | | | | | | | |
| Polyolefin A | | 50 | 50 | 50 | 50 | 50 | 50 | 50 | 50 | 50 | 50 | 50 |
| Copolymerizable monomer mixer (C) | styrene | 8 | 8 | 8 | 8 | 8 | 8 | 8 | 8 | 8 | 8 | 8 |
| | methyl methacrylate | | | | | | | | | | | |
| | ethyl acrylate | | | | | | | | | | | |
| | butyl acrylate | 10 | 10 | 10 | 10 | 10 | 10 | 10 | 10 | 10 | 10 | 10 |
| | butyl methacrylate | 29 | 29 | 29 | 29 | 29 | 29 | 29 | 29 | 29 | 29 | 29 |
| | isobutyl methacrylate | | | | | | | | | | | |
| | 2-ethylhexyl acrylate | | | | | | | | | | | |
| | hydroxyethel acrylate | | | | | | | | | | | |
| | hydroxyethel methacrylate | 2.5 | 2.5 | 2.5 | 2.5 | 2.5 | 2.5 | 2.5 | 2.5 | 2.5 | 2.5 | 2.5 |
| | methacrylic acid | 0.5 | 0.5 | 0.5 | 0.5 | 0.5 | 0.5 | 0.5 | 0.5 | 0.5 | 0.5 | 0.5 |
| Oils and fats | OLESTER C-1000 | | | | 10 | 10 | | | | 10 | 10 | 10 |
| | OLESTER F77-60MS | | | | | | | | | | | |
| | Modified OLESTER C-1000 | | | | | | 10 | | | 5 | | |
| Epoxy resin | EPOMIK R-140 | | | | 5 | | | | | | | |
| | DENACOL EX-941 | 10 | | | | | | | | | | |
| | Modified EPOMIK R-140 | | | | | | | | 10 | | | 5 |
| Polyester resin | ALMATEX P-646 | | 16.7 | | | | | | | | | |
| | OLESTER Q-173 | | | 10 | | 5 | | | | | | |
| | Modified ALMATEX P-646 | | | | | | | | | 16.7 | | 8.3 |
| Polymerization initiator | PBD | 1.1 | 1.1 | 1.1 | 1.1 | 1.1 | 1.1 | 1.1 | 1.1 | 1.1 | 1.1 | 1.1 |
| | AIBN | | | | | | 1 | | | | | |
| Dilution solvent 1 | SHELLSOL 70 | 28 | 21.3 | 28 | 28 | 28 | 28 | 28 | 21.3 | 28 | 28 | 24.7 |
| | xylene | | | | | | | | | | | |
| Organic peroxide | PBD | 7 | 7 | 7 | 7 | 30 | 7 | 7 | 7 | 7 | 7 | 7 |
| Dilution solvent 2 | xylene | 65 | 65 | 65 | 72.5 | 72.5 | 65 | 65 | 65 | 72.5 | 72.5 | 72.5 |

SHELLSOL 70 isoparaffin based organic solvent (manufactured by Shell Japan)

Examples 82–86

From 100 parts of the resin composition prepared in Example 1, 28, 55, 58 or 61, 54 parts of the solvent was removed at 100° C. under reduced pressure and 54 parts of propylene glycol monomethylether acetate was added to the residue. Further, 0.2% of ultraviolet absorber (TINUVIN-327) and 0.2% of antioxidant (IRGANOX-1330/IRGAFOS-168=1/1) for the resin content were added, respectively. The resulting mixture was dispersed with a disperser to obtain coating resin. The ultraviolet absorber and antioxidant used in these examples were manufactured by Ciba Specialty Chemicals Inc. and the names are Trade Mark of the company.

Examples 87–96

To 100 parts of the resin composition prepared in Example 1, 28, 55, 61 or 82–86, 30% by weight of titanium oxide pigment, Tipeqe-CR93 (Trade Mark of Ishihara Sangyo Co.) for the resin content was added. Further, 20 parts of an organic solvent mixture, xylene/toluene/ethyl acetate=1/1/1 was added. Successively, the same ultraviolet absorber and antioxidant as used in Examples 82–86 above were added in the same amount. The resulting mixture was dispersed with a disperser and coating resin was obtained.

Examples 97–106

With each resin composition in Example 1, 28, 55, 58, 61 or 82–86, a curing agent OLESTER-NP1200 (Trade Mark of Mitsui Chemicals Inc., nonvolatile: 70%, NCO: 7%) was mixed in an amount to obtain OH/NCO having 1/1 by mole. Coating resin was thus prepared.

Following polyolefin was used in these examples.

Example 1, 5–27, 28, 32–54, 55, 58 and 61–81

VEST PLAST VP-750 (Trade Mark of Huels Japan, Mw=70,000, $C_2/C_3/C_4$=11/66/23 (by mole)

Example 2, 29, 56 and 59

VEST PLAST VP-708 (Trade Mark of Huels Japan, Mw=45,000, $C_2/C_3/C_4$=12/68/20 (by mole)

Example 3 and 30

TAFMER S-4020 (Trade Mark of Mitsui Chemicals Inc., $C_2/C_3$=40/60 (by mole))

Example 4, 31, 57 and 60

UBE TACK UT-2715 (Trade Mark of UBE Industries, Mw=30,000, $C_3/C_4$=65/35 (by mole))

In the description, $C_2$ is ethylene repeating unit, $C_3$ is propylene repeating unitand $C_4$ is butene repeating unit, respectively.

Following the third components were used in these examples.

Oils and Fats or Derivative Thereof

OLESTER C-1000 (Trade Mark of Mitsui Chemicals, oil modified polyol, nonvolatile: 100%, hydroxyl value: 160 KOH mg/g)

OLESTER F77-60MS (Trade Mark of Mitsui Chemicals, oil modified polyurethane resin, nonvolatile: 60%)

Epoxy Resin

EPOMIK R-140 (Trade Mark of Mitsui Chemicals, nonvolatile: 100%, epoxy equivalent: 190 g/eq)

DENACOL EX-941 (Trade Mark of Nagase Chemical Industry, nonvolatile: 100%, epoxy equivalent: 172 g/eq)

Polyester Resin

ALMATEX P-646 (Trade Mark of Mitsui Chemicals, nonvolatile: 60%, hydroxyl value: 35 KOH mg/g)

OLESTER Q-173 (Trade Mark of Mitsui Chemicals, nonvolatile: 100%, hydroxyl value: 245 KOH mg/g)

SHELLSOL 70 used in the above examples is an isoparaffin based organic solvent manufactured by Shell Japan.

Modified resins used in these examples were prepared by the following procedures.

Modified OLESTER C-1000 has a polymerizable unsaturated bond in the molecule and was prepared by adding 0.14 g of maleic anhydride to 10 g of OLESTER C-1000 and reacting at 100° C. for 3 hours with stirring.

Modified EPOMIK R-140 has a polymerizable unsaturated bond in the molecule and was prepared by adding 0.12 g of maleic anhydride to 10 g of EPOMIK R-140 and reacting at 100° C. for 3 hours with stirring.

Modified ALMATEX P-646 has a polymerizable unsaturated bond in the molecule and was prepared by adding 0.004 g of maleic anhydride to 10 g of ALMATEX P-646 and reacting at 100° C. for 3 hours with stirring.

Comparative Example 1

The resin composition was prepared by carrying out the same procedures as Example 1 except that PBD was not added.

Comparative Example 2

The same procedures were carried out as Example 1 except that the weight ratio of polyolefin (A) and (co)polymer (B) was 8/92 and the weight ratio of PBD and dilution solvent to the amount of resin solid was the same as Example 1, respectively. The resin composition was thus obtained.

Comparative Example 3

A resin composition was prepared by carrying out the same procedures as Example 1 except that the weight ratio of polyolefin (A) and (co)polymer (B) was 90.3/9.7 and the weight ratio of PBD and dilution solvent individually to the amount of resin solid was the same as Example 1, respectively.

Comparative Example 4

A resin composition was prepared by carrying out the same procedures as Example 28 except that PBD was not added.

Comparative Example 5 and 6

A resin composition was prepared by carrying out the same procedures as Example 28 except that the raw materials were used in an amount shown on the column of Reaction in Table 2-1. The weight ratio of polyolefin (A) and (co)polymer (B) in the resulting resin composition was 8/92 in Comparative Example 5 and 90.1/9.9 in Comparative Example 6.

Comparative Example 7

A resin composition was prepared by carrying out the same procedures as Example 61 except that PBD was not added.

Comparative Example 8

A resin composition was prepared by carrying out the same procedures as Example 61 except that polyolefin and copolymerizable monomer mixture were used in amounts so as to obtain 8/92 in the weight ratio of polyolefin (A) and copolymerizable monomer mixture (C).

Comparative Example 9

A resin composition was prepared by carrying out the same procedures as Example 61 except that polyolefin and copolymerizable monomer mixture were used in amounts so as to obtain 92/8 in the weight ratio of polyolefin (A) and copolymerizable monomer mixture (C).

TABLE 2-1

|  |  | (parts by weight) Comparative Example |  |  |  |  |  |
|---|---|---|---|---|---|---|---|
|  |  | 1 | 2 | 3 | 4 | 5 | 6 |
| Preparation of copolymer (B) |  |  |  |  |  |  |  |
| Solvent | xylene | 72 | 72 | 72 | 72 | 72 | 72 |
|  | toluene |  |  |  |  |  |  |
| Copolymerizable monomer mixture (C) | styrene | 10 | 10 | 10 | 10 | 10 | 10 |
|  | methyl methacrylate | 66.6 | 66.6 | 66.6 | 66.6 | 66.6 | 66.6 |
|  | ethyl acrylate | 16 | 16 | 16 | 16 | 16 | 16 |
|  | butyl acrylate |  |  |  |  |  |  |
|  | butyl methacrylate |  |  |  |  |  |  |
|  | isobutyl methacrylate |  |  |  |  |  |  |
|  | hydroxyethel methacrylate | 7 | 7 | 7 | 7 | 7 | 7 |
|  | acrylic acid |  |  |  |  |  |  |
|  | methacrylic acid | 0.4 | 0.4 | 0.4 | 0.4 | 0.4 | 0.4 |
| Polymerization initiator | PBO | 1.5 | 1.5 | 1.5 | 1.5 | 1.5 | 1.5 |
| Dilution solvent | xylene | 28 | 28 | 28 | 28 | 28 | 28 |
|  | toluene |  |  |  |  |  |  |
| Carboxylic anhydrides | maleic anhydride |  |  |  |  | 2 | 2 |
|  | dodecenyl succinic anhydride |  |  |  |  |  |  |
| Reaction |  |  |  |  |  |  |  |
| Polyolefin (A) |  | 100 | 9 | 930 | 100 | 9 | 930 |
| Oils and fats | OLESTER C-1000 |  |  |  |  |  |  |
|  | OLESTER F77-60MS |  |  |  |  |  |  |
| Epoxy resin | EPOMIK R-140 |  |  |  |  |  |  |
|  | DENACOL EX-941 |  |  |  |  |  |  |

TABLE 2-1-continued

|  |  | (parts by weight) Comparative Example | | | | | |
|---|---|---|---|---|---|---|---|
|  |  | 1 | 2 | 3 | 4 | 5 | 6 |
| Polyester resin | ALMATEX P-646 |  |  |  |  |  |  |
|  | OLESTER Q-173 |  |  |  |  |  |  |
| Solvent | xylene | 100 | 9 | 930 | 100 | 9 | 930 |
|  | toluene |  |  |  |  |  |  |
| Organic peroxide | PBD |  | 7.7 | 72.3 |  | 3.3 | 31 |
| Dilution solvent | xylene | 267 | 145 | 1373 | 271 | 150 | 1378 |
|  | toluene |  |  |  |  |  |  |

SHELLSOL 70 isoparaffin based organic solvent (manufactured by Shell Japan)

TABLE 2-2

|  |  | (parts by weight) Comparative Example | | |
|---|---|---|---|---|
|  |  | 7 | 8 | 9 |
| Solvent | SHELLSOL 70 | 72 | 72 | 72 |
|  | xylene |  |  |  |
| Polyolefin (A) |  | 50 | 8 | 92 |
| Copolymerizable | styrene | 5 | 9.2 | 0.8 |
| monomer (C) | methyl methacrylate | 33.3 | 61.3 | 5.3 |
|  | ethyl acrylate | 8 | 14.7 | 1.3 |
|  | butyl acrylate |  |  |  |
|  | butyl methacrylate |  |  |  |
|  | isobutyl methacrylate |  |  |  |
|  | 2-ethylhexyl acrylate |  |  |  |
|  | hydroxyethel acrylate |  |  |  |
|  | hydroxyethel methacrylate | 3.5 | 6.4 | 0.6 |
|  | methacrylic acid | 0.2 | 0.37 | 0.03 |
| Oils and fats | OLESTER C-1000 |  |  |  |
|  | OLESTER F77-60MS |  |  |  |
| Epoxy resin | EPOMIK R-140 |  |  |  |
|  | DENACOL EX-941 |  |  |  |
| Polyester resin | ALMATEX P-646 |  |  |  |
|  | OLESTER Q-173 |  |  |  |
| Polymerization initiator | PBD | 1.0 | 1.0 | 1.0 |
| Dilution solvent 1 | SHELLSOL 70 | 28 | 28 | 28 |
|  | xylene |  |  |  |
| Organic peroxide | PBD |  | 7 | 7 |
| Dilution solvent 2 | xylene | 50 | 50 | 50 |

SHELLSOL 70 isoparaffin based organic solvent (manufactured by Shell Japan)

Solution Viscosity of a Resin Composition

The resin composition obtained was diluted with the same solvent as used in the preparation step so as to obtain an nonvolatile content of 30%. Dropping time was measured at 25° C. with a Ford Cup No. 4 in accordance with JIS K-5400. The results are shown in Table 3-1 to 3-3 on examples and Table 4 on comparative examples.

Stability of Resin Solution

A solution of resin composition obtained was diluted to have a nonvolatile content of 30% and allowed to stand for a week at 40° C. Thereafter, the state of the solution was evaluated and divided into the following three classes.

◯: Both liquid phase separation and solid precipitation were not found.

Δ: Liquid phase separation and/or solid precipitation were found and could be dispersed with ease by stirring.

X: Liquid phase separation and/or solid precipitation were found and could not be dispersed with ease by stirring.

The results are in shown Table 3-1 to 3-3 on examples and Table 4 on comparative examples.

Stability test was not carried out on Examples 97–106.

Sprayability of resin solution

The solution of resin composition obtained in each example and comparative example was sprayed by using a spray gun WIDER SPRAYGUN W-88-13H5G (manufactured by Iwata Tosoki Kogyo Co.) at spray pressure 4 kg/cm$^2$, nozzle opening per one rotary, and booth temperature 30° C. Generation of cobwebbing was checked.

◯: Quite no cobwebbing was found.

X: one or more cobwebbing were found.

The results are shown in Table 3-1 to 3-3 on examples and Table 4 on comparative examples.

Crosscut Adhesion Test, Peel Strength Measurement and Weatherability Test

The solution of resin composition obtained was diluted with the same solvent used in the preparation step and controlled to have a dropping time of 15±2 seconds by using a Ford Cup No. 4 at 25° C. Successively, a polypropylene square plate J-705 (manufactured by Grand Polymer Co.) was wiped with isopropyl alcohol and the resulting solution was sprayed on the plate so as to obtain a film thickness of 10 μm after drying. A crosscut adhesion test and weatherability test (Examples 82–106) were carried out.

Further, on Examples 1–81 and Comparative Examples 2, 3, 5, 6 and 7–9, white topcoat was applied to film having a thickness of 20 μm after drying, allowed to stand for 10 minutes at room temperature, and baked in an oven at 100° C. for 30 minutes. Thus obtained film was subjected to a crosscut adhesion test, peel strength measurement and weatherability test. When the results of crosscut adhesion test after application of topcoat were 100/100 (no peeling was found), peel strength measurement was carried out. The results are shown in Table 3-1 to 3-3 on examples and Table 4 on comparative examples.

The topcoat used above was prepared by the following procedures. The principal component was obtained by dispersing Tipeqe CR-93 (manufactured by Ishihara Sangyo Co.) in OLESTER Q-186 (manufactured by Mitsui Chemicals Inc., nonvolatile: 50%, hydoxyl value: 30 KOH mg/g) to have 30 PWC. A curing agent contaning NCO groups: OLESTER NM 89-50G (manufactured by Mitsui Chemicals Inc., nonvolatile 50%, NCO 6%) was mixed so as to obtain OH/NCO=0.95.

Crosscut Adhesion Test

The test was carried out in accordance with JIS K-5400, crosscut adhesion test. Crosscuts were prepared on a specimen, an adhesive cellophane tape was adhered on the crosscuts and peeled by quickly pulling to the direction of 90°. Evaluation was carried out by the remained number of crosscuts in 100 crosscuts on the specimen. The results are shown in Table 3-1 to 3-3 on examples and Table 4 on comparative examples.

Peel Strength Measurement

A coated specimen was matched with an interval of 1 cm and the terminal portion was peeled. Peel strength was measured by pulling the peeled portion to the direction of 180° at a velocity of 50 mm/min. Peel strength was divided into the following three classes.
⊚: more than 800 g/cm peel strength
○: 400 to 800 g/cm peel strength
X: less than 400 g/cm peel strength The results are shown in Table 3-1 to 3-3 on examples and Table 4 on comparative examples.

Weatherability Test

Weatherability test was evaluated by using a sunshine carbon arc lamp in accordance with JIS K-5400: a method for testing accelerated weatherability. A 60° specular gloss degree was measured after exposure for 500 hours in accordance with JIS K-5400. Retention of specular gloss was calculated by the following equation.

Retention (%)=(specular gloss degree after exposure)/(specular gloss degree before exposure)×100

Weatherability was divided into the following three classes.
○: 80% or more retention and no color change
Δ: 60% or more to less than 80% retention
X: less than 60% retention The results are shown in Table 3-1 to 3-3 on examples and Table 4 on comparative examples.

TABLE 3-1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Solution property | solution viscosity (sec) | 25 | 22 | 35 | 20 | 26 | 27 | 27 | 24 | 26 | 24 | 28 | 29 |
| | stability | ○ | ○ | ○ | ○ | ○ | ○ | ○ | ○ | ○ | ○ | ○ | ○ |
| Sprayability | | ○ | ○ | ○ | ○ | ○ | ○ | ○ | ○ | ○ | ○ | ○ | ○ |
| Film property | crosscut adhesion | 100 | 100 | 100 | 100 | 100 | 100 | 100 | 100 | 100 | 100 | 100 | 100 |
| Topcoated film property | crosscut adhesion | 100 | 100 | 100 | 100 | 100 | 100 | 100 | 100 | 100 | 100 | 100 | 100 |
| | peel strength | ○ | ○ | ○ | ○ | ○ | ⊚ | ○ | ○ | ○ | ○ | ○ | ○ |
| | accelerated weatherability | ○ | ○ | ○ | ○ | ○ | ○ | ○ | ○ | ○ | ○ | ○ | ○ |
| | | 13 | 14 | 15 | 16 | 17 | 18 | 19 | 20 | 21 | 22 | 23 | 24 |
| Solution property | solution viscosity (sec) | 28 | 29 | 30 | 24 | 22 | 27 | 29 | 27 | 29 | 31 | 27 | 30 |
| | stability | ○ | ○ | ○ | ○ | ○ | ○ | ○ | ○ | ○ | ○ | ○ | ○ |
| Sprayability | | ○ | ○ | ○ | ○ | ○ | ○ | ○ | ○ | ○ | ○ | ○ | ○ |
| Film property | crosscut adhesion | 100 | 100 | 100 | 100 | 100 | 100 | 100 | 100 | 100 | 100 | 100 | 100 |
| Topcoated film property | crosscut adhesion | 100 | 100 | 100 | 100 | 100 | 100 | 100 | 100 | 100 | 100 | 100 | 100 |
| | peel strength | ⊚ | ⊚ | ⊚ | ⊚ | ⊚ | ⊚ | ⊚ | ⊚ | ⊚ | ⊚ | ⊚ | ⊚ |
| | accelerated weatherability | ○ | ○ | ○ | ○ | ○ | ○ | ○ | ○ | ○ | ○ | ○ | ○ |
| | | 25 | 26 | 27 | 28 | 29 | 30 | 31 | 32 | 33 | 34 | 35 | 36 |
| Solution property | solution viscosity (sec) | 32 | 28 | 30 | 32 | 31 | 40 | 27 | 30 | 35 | 32 | 30 | 30 |
| | stability | ○ | ○ | ○ | ○ | ○ | ○ | ○ | ○ | ○ | ○ | ○ | ○ |
| Sprayability | | ○ | ○ | ○ | ○ | ○ | ○ | ○ | ○ | ○ | ○ | ○ | ○ |
| Film property | crosscut adhesion | 100 | 100 | 100 | 100 | 100 | 100 | 100 | 100 | 100 | 100 | 100 | 100 |
| Topcoated film property | crosscut adhesion | 100 | 100 | 100 | 100 | 100 | 100 | 100 | 100 | 100 | 100 | 100 | 100 |
| | peel strength | ⊚ | ⊚ | ⊚ | ○ | ○ | ○ | ○ | ○ | ○ | ⊚ | ○ | ○ |
| | accelerated weatherability | ○ | ○ | ○ | ○ | ○ | ○ | ○ | ○ | ○ | ○ | ○ | ○ |

TABLE 3-2

| | | Example | | | | | | | | | | | |
|---|---|---|---|---|---|---|---|---|---|---|---|---|---|
| | | 37 | 38 | 39 | 40 | 41 | 42 | 43 | 44 | 45 | 46 | 47 | 48 |
| Solution property | solution viscosity (sec) | 33 | 43 | 39 | 48 | 39 | 40 | 35 | 34 | 36 | 38 | 37 | 39 |
| | stability | ○ | ○ | ○ | ○ | ○ | ○ | ○ | ○ | ○ | ○ | ○ | ○ |
| Sprayability | | ○ | ○ | ○ | ○ | ○ | ○ | ○ | ○ | ○ | ○ | ○ | ○ |
| Film property | crosscut adhesion | 100 | 100 | 100 | 100 | 100 | 100 | 100 | 100 | 100 | 100 | 100 | 100 |
| Topcoated film property | crosscut adhesion | 100 | 100 | 100 | 100 | 100 | 100 | 100 | 100 | 100 | 100 | 100 | 100 |
| | peel strength | ○ | ○ | ○ | ○ | ⊚ | ⊚ | ⊚ | ⊚ | ⊚ | ⊚ | ⊚ | ⊚ |
| | accelerated weatherability | ○ | ○ | ○ | ○ | ○ | ○ | ○ | ○ | ○ | ○ | ○ | ○ |
| | | 49 | 50 | 51 | 52 | 53 | 54 | 55 | 56 | 57 | 58 | 59 | 60 |
| Solution property | solution viscosity (sec) | 42 | 37 | 38 | 42 | 39 | 40 | 25 | 21 | 17 | 40 | 37 | 30 |
| | stability | ○ | ○ | ○ | ○ | ○ | ○ | ○ | ○ | ○ | ○ | ○ | ○ |
| Sprayability | | ○ | ○ | ○ | ○ | ○ | ○ | ○ | ○ | ○ | ○ | ○ | ○ |
| Film property | crosscut adhesion | 100 | 100 | 100 | 100 | 100 | 100 | 100 | 100 | 100 | 100 | 100 | 100 |
| Topcoated film property | crosscut adhesion | 100 | 100 | 100 | 100 | 100 | 100 | 100 | 100 | 100 | 100 | 100 | 100 |
| | peel strength | ⊚ | ⊚ | ⊚ | ⊚ | ⊚ | ⊚ | ○ | ○ | ○ | ○ | ○ | ○ |
| | accelerated weatherability | ○ | ○ | ○ | ○ | ○ | ○ | ○ | ○ | ○ | ○ | ○ | ○ |
| | | 61 | 62 | 63 | 64 | 65 | 66 | 67 | 68 | 69 | 70 | 71 | 72 |
| Solution | solution viscosity (sec) | 34 | 47 | 21 | 26 | 26 | 27 | 25 | 27 | 29 | 24 | 23 | 27 |

TABLE 3-2-continued

|  |  | Example | | | | | | | | | | | |
|---|---|---|---|---|---|---|---|---|---|---|---|---|
| property | stability | ○ | ○ | ○ | ○ | ○ | ○ | ○ | ○ | ○ | ○ | ○ | ○ |
| Sprayability |  | ○ | ○ | ○ | ○ | ○ | ○ | ○ | ○ | ○ | ○ | ○ | ○ |
| Film property | crosscut adhesion | 100 | 100 | 100 | 100 | 100 | 100 | 100 | 100 | 100 | 100 | 100 | 100 |
| Topcoated | crosscut adhesion | 100 | 100 | 100 | 100 | 100 | 100 | 100 | 100 | 100 | 100 | 100 | 100 |
| film property | peel strength | ⊙ | ⊙ | ○ | ○ | ○ | ○ | ○ | ⊙ | ⊙ | ⊙ | ⊙ | ⊙ |
|  | accelerated weatherability | ○ | ○ | ○ | ○ | ○ | ○ | ○ | ○ | ○ | ○ | ○ | ○ |

TABLE 3-3

|  |  | Example | | | | | | | | | | | |
|---|---|---|---|---|---|---|---|---|---|---|---|---|
|  |  | 73 | 74 | 75 | 76 | 77 | 78 | 79 | 80 | 81 | 82 | 83 | 84 |
| Solution | solution viscosity (sec) | 28 | 25 | 27 | 29 | 26 | 29 | 30 | 27 | 29 | 38 | 37 | 39 |
| property | stability | ○ | ○ | ○ | ○ | ○ | ○ | ○ | ○ | ○ | ○ | ○ | ○ |
| Sprayability |  | ○ | ○ | ○ | ○ | ○ | ○ | ○ | ○ | ○ | ○ | ○ | ○ |
| Film property | crosscut adhesion | 100 | 100 | 100 | 100 | 100 | 100 | 100 | 100 | 100 | 100 | 100 | 100 |
|  | accelerated weatherability |  |  |  |  |  |  |  |  |  | ○ | ○ | ○ |
| Topcoated | crosscut adhesion | 100 | 100 | 100 | 100 | 100 | 100 | 100 | 100 | 100 | 100 | 100 | 100 |
| film property | peel strength | ⊙ | ⊙ | ⊙ | ⊙ | ⊙ | ⊙ | ⊙ | ⊙ | ⊙ | ⊙ | ⊙ | ⊙ |
|  | accelerated weatherability | ○ | ○ | ○ | ○ | ○ | ○ | ○ | ○ | ○ | ○ | ○ | ○ |

|  |  | 85 | 86 | 87 | 88 | 89 | 90 | 91 | 92 | 93 | 94 | 95 | 96 |
|---|---|---|---|---|---|---|---|---|---|---|---|---|---|
| Solution | solution viscosity (sec) | 41 | 36 | 30 | 37 | 29 | 44 | 37 | 31 | 37 | 31 | 44 | 38 |
| property | stability | ○ | ○ | Δ | Δ | Δ | Δ | Δ | ○ | ○ | ○ | ○ | ○ |
| Sprayability |  | ○ | ○ | ○ | ○ | ○ | ○ | ○ | ○ | ○ | ○ | ○ | ○ |
| Film property | crosscut adhesion | 100 | 100 | 100 | 100 | 100 | 100 | 100 | 100 | 100 | 100 | 100 | 100 |
|  | accelerated weatherability | ○ | ○ | ○ | ○ | ○ | ○ | ○ | ○ | ○ | ○ | ○ | ○ |
| Topcoated | crosscut adhesion | 100 | 100 |  |  |  |  |  |  |  |  |  |  |
| film property | peel strength |  |  |  |  |  |  |  |  |  |  |  |  |
|  | accelerated weatherability |  |  |  |  |  |  |  |  |  |  |  |  |

|  |  |  | 97 | 98 | 99 | 100 | 101 | 102 | 103 | 104 | 105 | 106 |
|---|---|---|---|---|---|---|---|---|---|---|---|---|
| Solution property | solution viscosity (sec) stability |  | 29 | 36 | 30 | 44 | 37 | 31 | 35 | 33 | 41 | 40 |
| Sprayability |  |  | ○ | ○ | ○ | ○ | ○ | ○ | ○ | ○ | ○ | ○ |
| Film property | crosscut adhesion |  | 100 | 100 | 100 | 100 | 100 | 100 | 100 | 100 | 100 | 100 |
| Topcoated film property | crosscut adhesion peel strength accelerated weatherability |  | ○ | ○ | ○ | ○ | ○ | ○ | ○ | ○ | ○ | ○ |

TABLE 4

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Solution | solution viscosity (sec) | 50 | 40 | 38 | 58 | 45 | 47 | 45 | 27 | 51 |
| property | stability | Δ | ○ | ○ | Δ | ○ | ○ | Δ | ○ | ○ |
| Sprayability |  | ○ | ○ | ○ | ○ | ○ | ○ | ○ | ○ | ○ |
| Film property | crosscut adhesion | 0 | 20 | 100 | 0 | 60 | 100 | 10 | 20 | 100 |
| Topcoated | crosscut adhesion |  | 0 | 0 |  | 0 | 0 | 0 | 0 | 0 |
| film property | peel strength |  |  |  |  |  |  |  |  |  |
|  | accelerated weatherability |  |  |  |  |  |  |  |  |  |

Effect of Invention

The resin composition of the invention has good solution stability, does not cause liquid phase separation or solid precipitation, can be used as intact, and is excellent in sprayability at high concentration. Specifically, the resin composition has novel function and effect that adhesion to polyolefin molded articles is excellent.

By use of a curing agent capable of reacting with an active hydrogen atom and/or hydroxyl group of the resin composition in the invention, the resulting coated film has excellent weatherability and thus can be favorably used for coating and primer.

What is claimed is:

1. A resin composition obtained by reacting polyolefin (A) with a (co)polymer (B) prepared from a copolymerizable monomer mixture (C) comprising an α,β-monoethylenically unsaturated monomer and other copolymerizable monomers, in a weight ratio (A)/(B)=1/9–9/1, in a radical reaction in an organic solvent that dissolves polyolefin (A).

2. A resin composition obtained by polymerizing a copolymerizable monomer mixture (C) comprising an α,β-monoethylenically unsaturated monomer and other copolymerizable monomers in the presence of polyolefin (A) in a weight ratio (A)/(C)=1/9–9/1 in an organic solvent that dissolves polyolefin (A), and successively reacting the obtained reaction mass by radical reaction.

3. The resin composition according to claim 1, wherein the (co)polymer (B) is modified to have a polymerizable unsaturated bond in the molecule.

4. The resin composition according to claim 3, wherein the modification is obtained by reacting a (co)polymer (B) having a hydroxyl group in the molecule with a polymerizable unsaturated carboxylic anhydride.

5. The resin composition according to anyone of claims 1 to 4, wherein the resin composition comprises one or more third components selected from the group consisting of fats and fatty oils, derivatives of fats and fatty oils, epoxy resin and polyester resin.

6. The resin composition according to anyone of claim 1 to 4, wherein the polymerization reaction by radical reaction is carried out in the presence of organic peroxide.

7. The resin composition according to claim 5, wherein the polymerization reaction by radical reaction is carried out in the presence of organic peroxide.

8. The resin composition obtained by removing the solvent from the resin composition in anyone of the claims 1 to 4 and diluting the residue with an organic solvent.

9. The resin composition obtained by removing the solvent from the resin composition of claim 5 and diluting the residue with an organic solvent.

10. The resin composition obtained by removing the solvent from the resin composition of claim 6 and diluting the residue with an organic solvent.

11. The resin composition obtained by removing the solvent from the resin composition of claim 7 and diluting the residue with an organic solvent.

12. A coated film comprising the resin composition according to anyone of claims 1 to 4.

13. A coated film comprising the resin composition according to claim 5.

14. A coated film comprising the resin composition according to claim 6.

15. A coated film comprising the resin composition according to claim 7.

16. A coated film comprising the resin composition according to claim 8.

17. A coated film comprising the resin composition according to claim 9.

18. A coated film comprising the resin composition according to claim 10.

19. A coated film comprising the resin composition according to claim 11.

20. A coating comprising the resin composition according to anyone of claims 1 to 4 wherein the resin composition has an active hydrogen atom and/or hydroxyl group, and a curing agent capable of reacting with the active hydrogen atom and/or hydroxyl group.

21. A coating comprising the resin composition according to claim 5 wherein the resin composition has an active hydrogen atom and/or hydroxyl group, and a curing agent capable of reacting with the active hydrogen atom and/or hydroxyl group.

22. A coating comprising the resin composition according to claim 6 wherein the resin composition has an active hydrogen atom and/or hydroxyl group, and a curing agent capable of reacting with the active hydrogen atom and/or hydroxyl group.

23. A coating comprising the resin composition according to claim 7 wherein the resin composition has an active hydrogen atom and/or hydroxyl group, and a curing agent capable of reacting with the active hydrogen atom and/or hydroxyl group.

24. A coating comprising the resin composition according to claim 8 wherein the resin composition has an active hydrogen atom and/or hydroxyl group, and a curing agent capable of reacting with the active hydrogen atom and/or hydroxyl group.

25. A coating comprising the resin composition according to claim 9 wherein the resin composition has an active hydrogen atom and/or hydroxyl group, and a curing agent capable of reacting with the active hydrogen atom and/or hydroxyl group.

26. A coating comprising the resin composition according to claim 10 wherein the resin composition has an active hydrogen atom and/or hydroxyl group, and a curing agent capable of reacting with the active hydrogen atom and/or hydroxyl group.

27. A coating comprising the resin composition according to claim 11 wherein the resin composition has an active hydrogen atom and/or hydroxyl group, and a curing agent capable of reacting with the active hydrogen atom and/or hydroxyl group.

* * * * *